J. D. JONES.
SELF OILING BEARING.
APPLICATION FILED JAN. 22, 1920.

1,362,571.

Patented Dec. 14, 1920.

Witness

Inventor
John D. Jones.
By Eugene C. Brown
Attorney

UNITED STATES PATENT OFFICE.

JOHN D. JONES, OF WALLA WALLA, WASHINGTON.

SELF-OILING BEARING.

1,362,571.                    Specification of Letters Patent.    Patented Dec. 14, 1920.

Application filed January 22, 1920. Serial No. 353,230.

*To all whom it may concern:*

Be it known that I, JOHN D. JONES, a citizen of the United States, residing at Walla Walla, in the county of Walla Walla and State of Washington, have invented certain new and useful Improvements in Self-Oiling Bearings, of which the following is a specification.

This invention relates to self oiling bearings for shaft bearings, pulleys, hubs, etc. The purpose of my invention is to provide a practically dust proof bearing in which there is a constant circulation of oil along the bearing surfaces and which is automatically filtered as it is returned to the oil reservoir within the casing of the bearing. A further object is to provide a bearing which will operate for long periods of time upon a single charge of oil, requires no attention and reduces the wear to a minimum.

In the following description I shall refer to the accompanying drawings in which—

Figure 1:
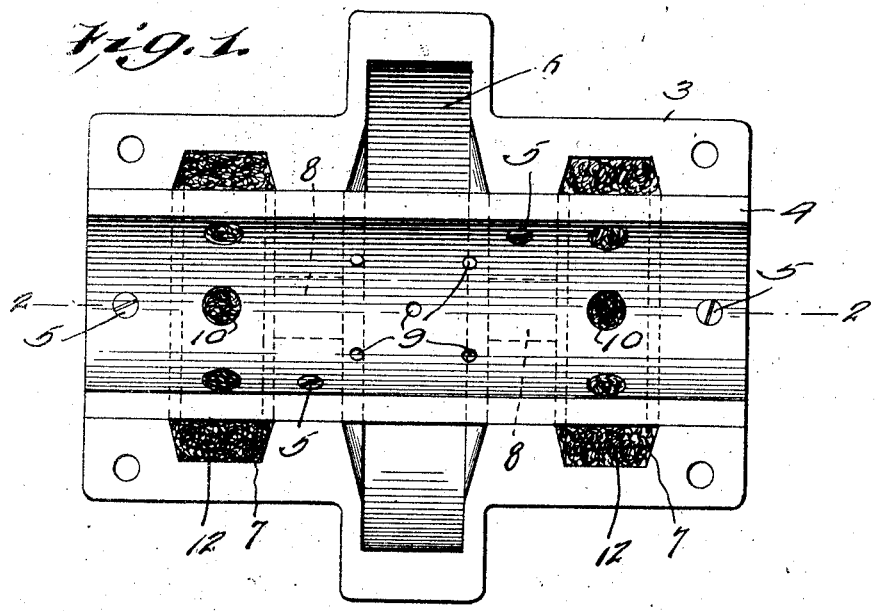
Figure 2:
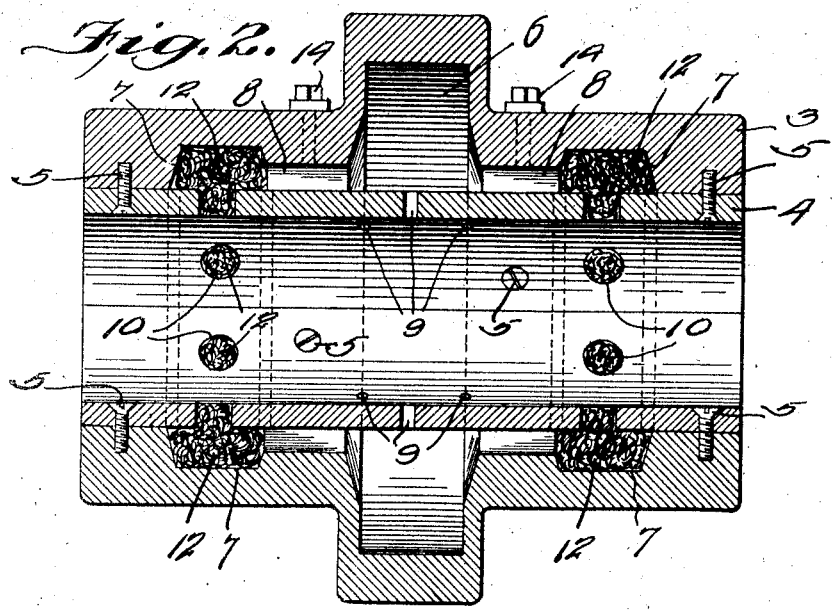

Figure 1 is a longitudinal sectional view of a bearing embodying my invention, and Fig. 2 is a sectional view taken on the line 2—2 of Fig. 1.

The casing or housing 3 of the bearing is preferably cast in halves which are bolted together and may be inserted in the hub of any form of pulley, support or hanger. The cylindrical bushing 4 which forms the bearing surface for the shaft is preferably of Babbitt metal and may also be made in halves and secured within the casing by screws 5. The casing is provided with a central annular oil reservoir or chamber 6 and with annular packing recesses 7 adjacent each end, which surround the bushing. The recesses 7 are connected with the oil reservoir by channels 8. The bushing is provided with a plurality of small apertures 9 which communicate with the oil reservoir and with a series of larger apertures 10 adjacent either end through which the wool packing 12 protrudes.

After the recesses 7 have been loosely packed with wool waste, the bushing members 4 are secured in position and the casings are bolted together. The oil chamber 6 is then filled with lubricating oil and the filling holes are plugged with the screw bolts 14, thereby hermetically sealing the oil chamber.

As the bearing rotates about the shaft, or vice versa, the oil in the reservoir 6 is drawn through the small apertures, presumably due to its viscosity aided by gravitation, and spreads in each direction from the center until the entire bearing surface is covered with a film of oil. As the oil comes in contact with the wool waste 12 protruding through the openings 10, it is drawn into the mass of waste, presumably partly by capillary action, and is thoroughly filtered, the dirt and foreign particles being retained by the waste. The constant withdrawal of oil from the reservoir through the apertures 9 produces a slight vacuum in the reservoir which produces a suction effect which operates to draw the oil from the packing recesses inwardly through the channels 8. The resultant effect of the inward movement of the oil through the apertures 9, the capillary or absorbent action of the wool waste and the suction through the channels 8, due to the partial vacuum produced in the reservoir, is to maintain a constant circulation of oil which insures a thorough and efficient lubrication of the bearing surfaces. This moving film of oil which is constantly being replaced carries along with it any dirt or foreign particles and maintains the bearing surfaces clean, and the complete film of oil between the bearing surfaces reduces the wear and friction to a minimum. A further result which I accomplish by the constant circulation is the automatic filtering of the oil, which is very thoroughly cleansed as it passes through the fibers of the wool waste. I have found that it is essential to employ a packing material which possesses high absorbent properties, such as wool waste, in order to produce an efficient circulation of the oil and that I am not able to secure these results with a non-absorbent material, such as cotton waste. There is, therefore, a coöperative relation and coaction between the indrawing action of the apertures 9 from the central reservoir, the capillary absorbent action of the wool waste and the suction action through the return channels 8, caused by the partial vacuum created in the reservoir. The resultant effect is a constant circulation of oil and the maintenance of a complete film of oil over the bearing surfaces.

I have described in detail the particular construction illustrated in the accompanying drawings for the purpose of clearly disclosing my invention but it will be obvious to engineers that various modifications and changes can be made without departing therefrom.

I claim:—

1. A self oiling bearing, comprising a casing or housing having a central annular oil chamber and annular packing or filtering recesses adjacent each end, said chamber being connected to said recesses by oil channels, and a tubular bushing secured within said casing and having small apertures forming inlet oil ducts connecting with said oil chamber and provided with larger apertures opening into said recesses adapted to permit waste within said recesses to protrude therethrough.

2. A self oiling bearing comprising in combination, a casing or housing having a centrally disposed annular oil chamber and annular packing recesses adjacent each end, said casing having also channels connecting said chamber and said recesses, a tubular bushing fitting tightly within said housing and provided with small apertures forming oil inlet ducts connecting with said oil chamber and provided with larger apertures opening into said recesses, a shaft within said bushing and rotatable with respect thereto, and absorbent fibrous material packed within said recesses and protruding through said larger apertures against said shaft, whereby oil drawn through said central ducts and moving outwardly along the shaft is taken up by said absorbent material and is returned to the oil chamber through said channels by the reduced pressure existing in the chamber by reason of the oil withdrawn through the oil ducts.

3. A self-oiling bearing, comprising a casing or housing having an air-tight oil chamber, an air-tight recess adjacent one end provided with packing or filtering material, a shaft rotatably mounted within the housing, ducts providing oil passages between said shaft and said oil chamber and between said recess and said shaft, and channels connecting said chamber and said recess, whereby when the shaft is in operation a subatmospheric pressure is created in the oil chamber thereby causing a circulation of oil along the shaft from the chamber to said recess and returning through said channels to the chamber.

In testimony whereof I affix my signature.

JOHN D. JONES.